Figure 1:
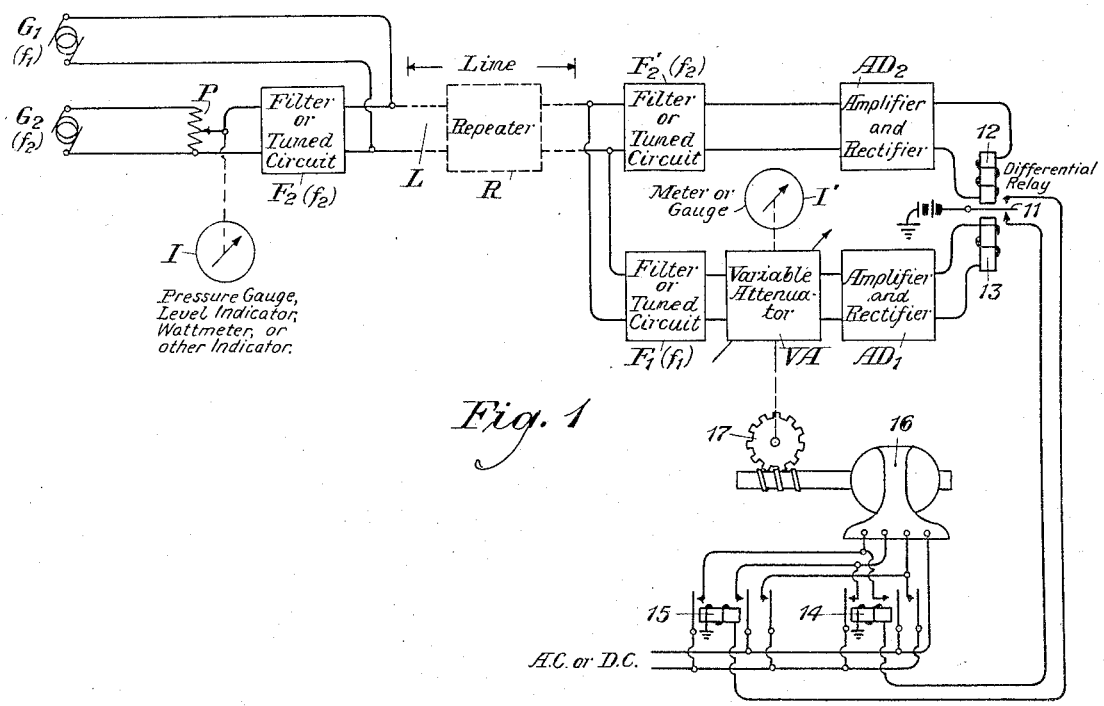

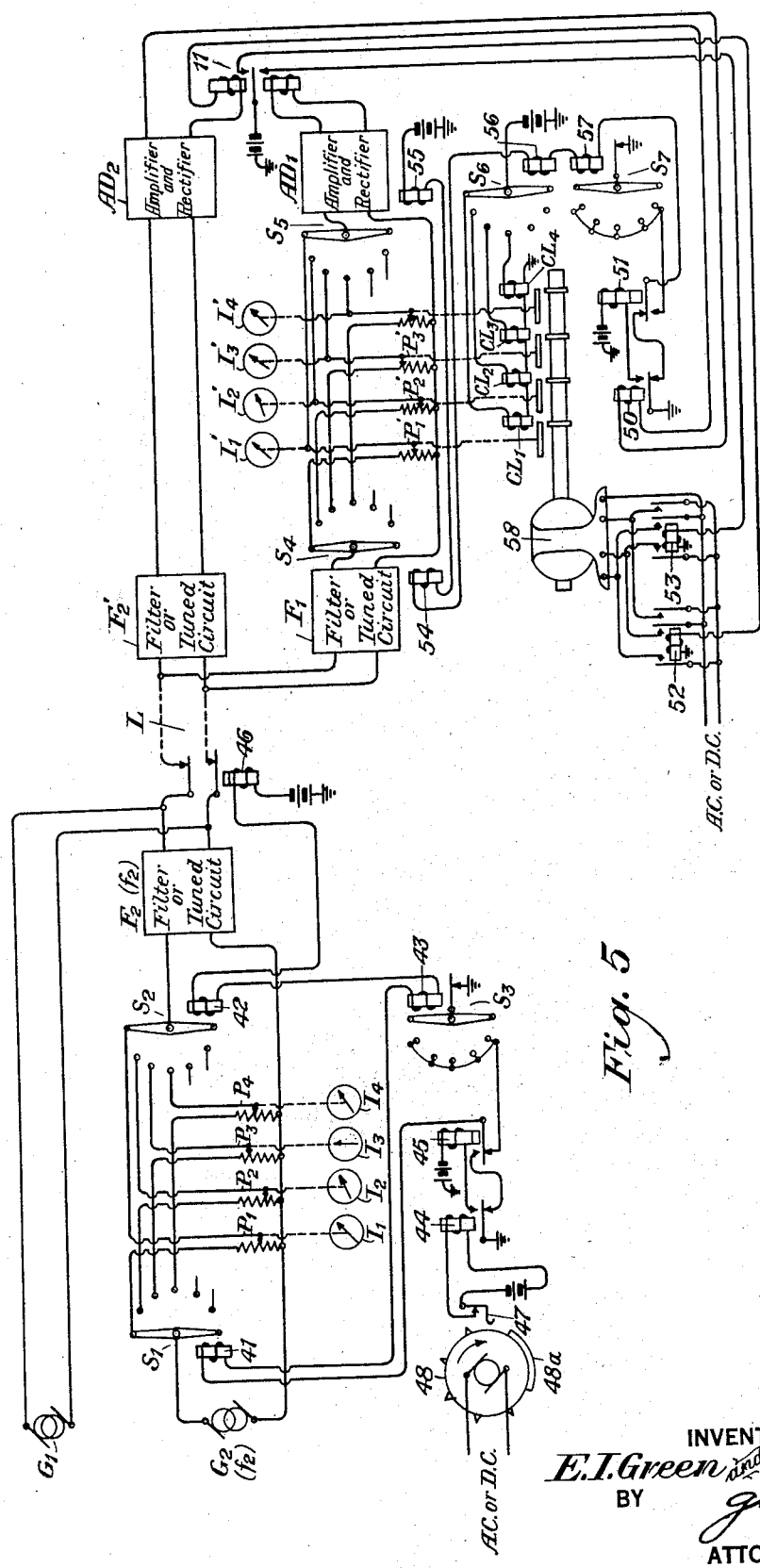

Patented May 5, 1936

2,039,404

UNITED STATES PATENT OFFICE 2,039,404

REMOTE METERING SYSTEM

Estill I. Green, East Orange, N. J., and Warren H. Tidd, White Plains, N. Y., assignors to American Telephone and Telegraph Company, a corporation of New York Application March 21, 1933, Serial No. 662,002

14 Claims. (Cl. 177—351)

This invention relates to arrangements for indicating at a remote point by electrical translating means the position of one or more movable elements of the magnitude of one or more physical quantities.

It is an object of the invention to provide a system adapted to the remote metering of such quantities as pressures, levels, positions, flows, voltages, currents, watts, etc.

A method which has heretofore been used for remote metering is to transmit current of a single frequency whose amplitude has been varied in accordance with the magnitude of a quantity to be remotely metered, and to utilize the amplitude of the received current to produce an indication of the magnitude of said quantity. Variation in the characteristics of the transmission channel employed will ordinarily affect the accuracy of an indication transmitted by this method. It is a purpose of the present invention to provide a system for remotely indicating the magnitude of one or more quantities in which the accuracy of the indication will not be affected by variations in the transmitting properties of the channel used.

In accordance with one embodiment of the invention an indication of the magnitude of a quantity which varies from time to time is transmitted as the ratio of the amplitudes of two electrical currents of different frequencies. The amplitude of the current of one frequency is varied in accordance with the indication to be transmitted. The current amplitude of the other frequency is transmitted unvaried. Both currents are transmitted to the location where it is desired to utilize the indication. The magnitude relation between the received currents is utilized to produce an indication of the magnitude of said quantity. This indication may also be recorded to produce a continuous register of the magnitude of said quantity.

In another form of the invention it is proposed to transmit three frequencies, the amplitude of one of which is modulated in accordance with the magnitude of a varying quantity. At the receiving location the amplitude relation between the three currents is utilized to produce an indication of the magnitude of said quantity.

A further purpose of the invention is to provide means whereby the readings of a plurality of instruments or the indications of the magnitudes of a plurality of remotely existing quantities may be totalized and the total continuously indicated on a single dial or recorded graphically.

Still another object of the invention is to provide means whereby the positions of a plurality of movable elements or the magnitudes of a plurality of quantities may be indicated at a remote point over a single communication channel.

Figure 2:
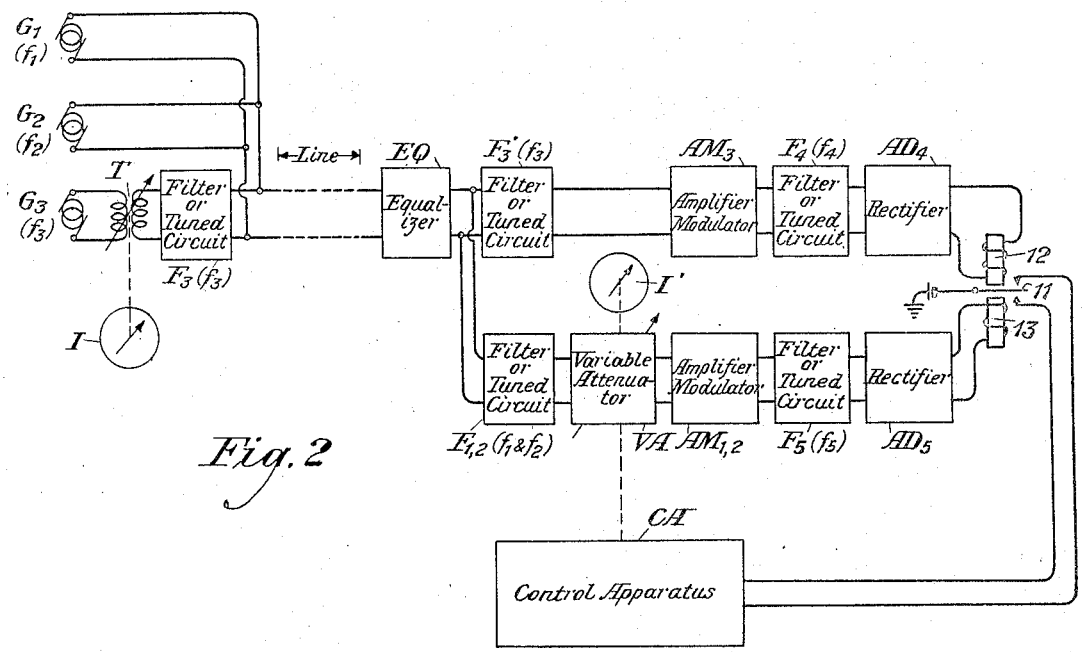
Figure 3:
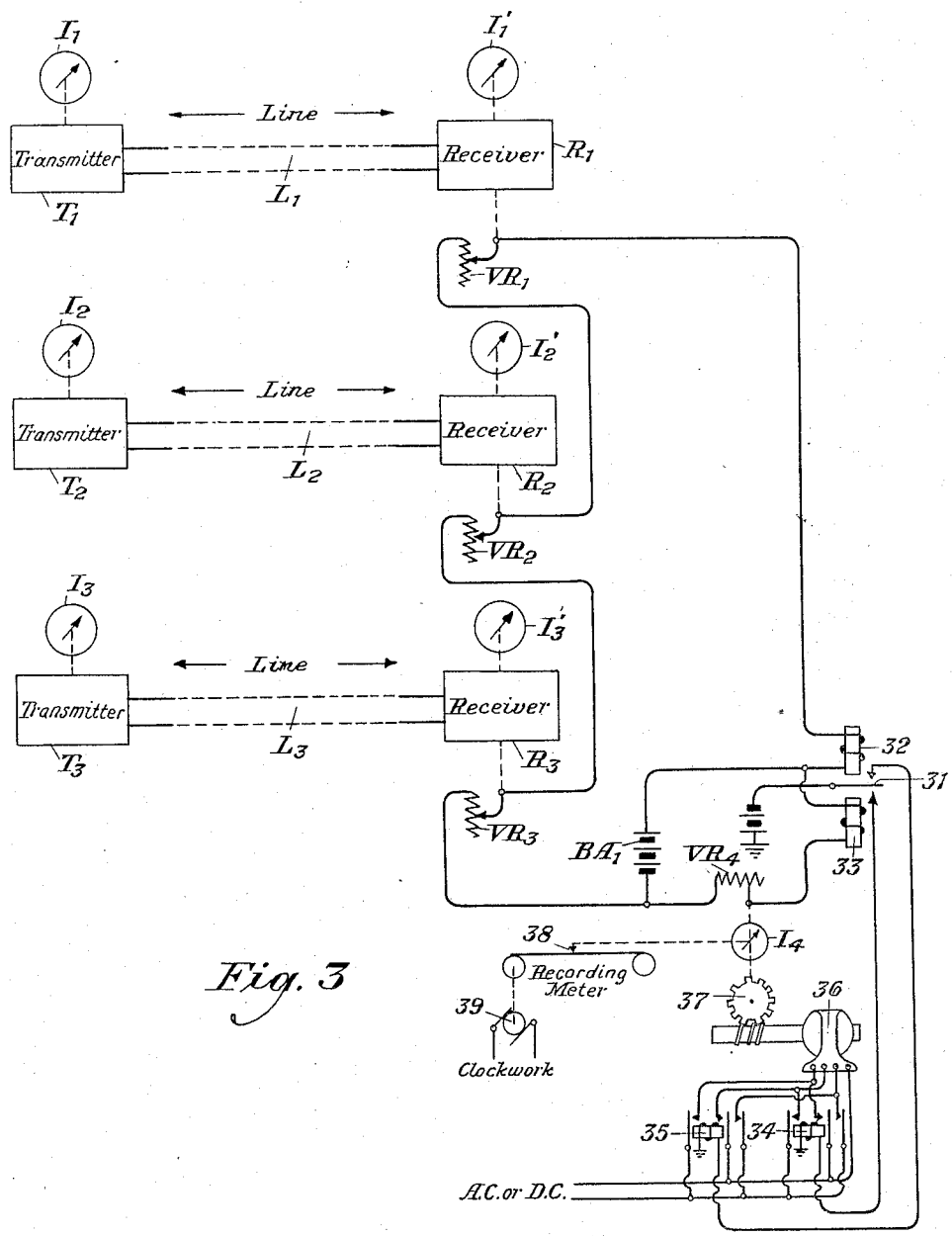
Figure 4:
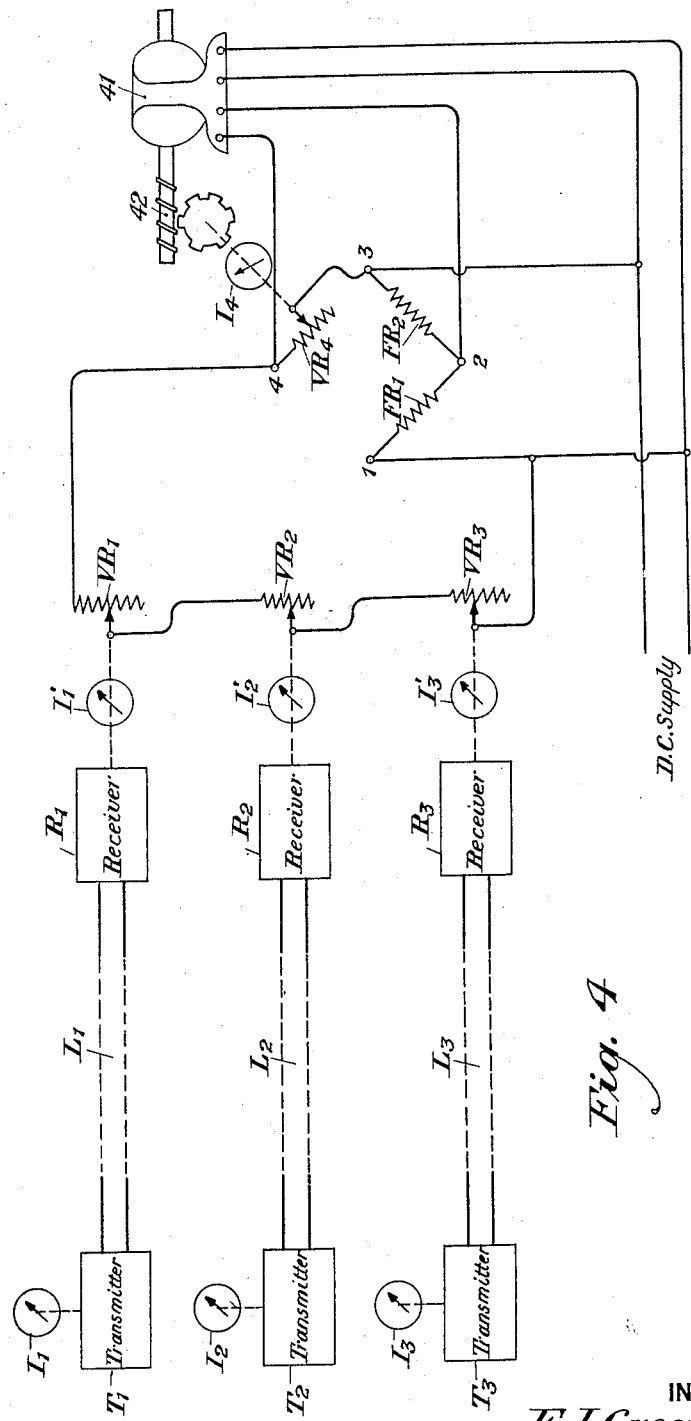

While the invention will be defined in the appended claims, the features of the invention will be more fully understood from the detailed exposition which follows, read in connection with the accompanying diagrams, Figures 1 to 5. Fig. 1 is a diagram showing one embodiment of the remote metering system using two frequencies. Fig. 2 is a possible embodiment of a remote indicating system employing three frequencies. Fig. 3 is a diagram of an embodiment of a system for indicating or recording the total of several measured quantities at different remote or local points. Another possible embodiment of such a system is shown in Fig. 4. Fig. 5 shows a system by means of which indications of the positions of several movable elements or the magnitude of several quantities may be transmitted from a remote point over a single communication channel.

Referring to Fig. 1, two oscillators $G_1$ and $G_2$ are shown which generate the frequencies $f_1$ and $f_2$. The amplitude of frequency $f_2$ which is transmitted is varied in accordance with the magnitude of some quantity, such as pressure, level, position, watt, voltage, current, etc., by the potentiometer P which is actuated directly or indirectly by a gauge, indicator, or other device I. The modulating element, instead of being a potentiometer, might be a variable magnetic coupling (as shown by T in Fig. 2) or some other suitable device. The variations in the magnitude of the frequency $f_2$ need not be directly proportional to the variations in the quantity to be indicated, but may bear any desired relation to such variations. A filter or tuned circuit $F_2$ is interposed in the system of Fig. 1 between the potentiometer and the line to keep the current of frequency $f_1$, which is transmitted unchanged, independent of the variations in $f_2$. The two frequencies $f_1$ and $f_2$ are applied to a suitable transmission medium L which may be a pair of wires in a telephone cable, a pair of open wires, a concentric conductor system or a radio circuit which terminates at the distant receiving point. The transmission line may includes intermediate amplifiers or repeaters as indicated by R in Fig. 1.

At the receiving end the two frequencies are separated by tuned circuits or filters $F_1'$ and $F_2'$. The current of frequency $f_2$ is then passed through an amplifier and rectifier $AD_2$ and the direct current resulting is applied to one winding 12 of a differential relay 11. The rectifier may be of the vacuum tube type or some passive device. Current of frequency $f_1$, after being selected by filter $F_1$, is passed through a variable attenuator VA which may be a potentiometer, variable magnetic coupling, or other device similar to that at the transmitting end, or a variable attenuating network such as a T or L type network. This current is then amplified and rectified in the detector $AD_1$ and the resultant direct current is applied to the opposing winding 13 of the differential relay 11. The amplitude of the rectified current corresponding to the frequency $f_1$ is controlled by the variable attenuator which is operated by the motor 16. The attenuator is so controlled by the motor 16 as to keep the magnitude of the currents in the two windings 12 and 13 of the differential relay 11 equal. When a sufficient difference exists between the currents in these two windings the relay operates, closing one of its contacts. This energizes either relay 14 or relay 15, the contacts of said relays being arranged to close circuits whereby the motor 16 will rotate in one direction or the other. The direction of rotation of motor 16 is such that the attenuator which is driven by it through coupling device 17 tends to restore the equality of the currents in relay 11.

It will now be seen that the position of the variable attenuator A corresponds at any time to the amplitude ratio of the two received currents of different frequency. The ratio of the amplitudes of the two currents transmitted has been made dependent on the magnitude of the remote quantity. Therefore, the position of the variable attenuator VA also depends on the magnitude of this quantity. A dial or indicator I' is operated in conjunction with the variable attenuator VA and indicates its position. This dial may, therefore, be calibrated to indicate the magnitude of the quantity measured by I. Thus the indication of the magnitude of the remote quantity will be independent of the variations in the absolute magnitude of the received currents caused by transmission changes in the channel, this indication being dependent only on their relative magnitude.

The attenuator A might, if desired, be placed in the circuit of $f_2$, the variations in this case being the reverse of those obtained with the arrangement shown.

Since the system of Fig. 1 depends on the ratio of the currents of two frequencies, its accuracy may be affected by attenuation changes in the transmission medium (as, for example, those due to temperature variations, leakage changes, repeater variations, etc.) which affect the two frequencies differently. It is quite probable that should such changes be present, the desired degree of accuracy could be attained in the system which has been described above by choosing the two frequencies sufficiently close together. Another method of obviating such a difficulty has been devised, however, and a possible embodiment thereof is shown in Fig. 2.

In this system three generators are shown, $G_1$, $G_2$ and $G_3$, generating three different frequencies, $f_1$, $f_2$ and $f_3$. The amplitude of the current of frequency $f_3$ is varied in accordance with the magnitude of the quantity measured by the meter or gauge I. In this case variable magnetic coupling between the two windings of the transformer T has been used. The current of frequency $f_3$ is transmitted over the line with the currents of the other two frequencies $f_1$ and $f_2$ whose amplitudes have not been altered.

At the receiving location an equalizer EQ is provided so that the loss of the line and equalizer may be made the same at all three frequencies when first adjusted. Current of frequency $f_3$ is selected by a filter or tuned circuit $F_3'$ and introduced to an amplifier and modulator $AM_3$. A filter or tuned circuit $F_4$ selects a modulation product such as the second harmonic of $f_3$, i. e., $f_4=2f_3$. This frequency $f_4$ is then rectified in the detector $AD_4$ and the resultant direct current is applied to one winding 12 of the differential relay 11.

A combination of filters or tuned circuits $F_{1,2}$ selects the currents of frequencies $f_1$ and $f_2$ and passes them through a variable attenuator VA to an amplifier and modulator $AM_{1,2}$. Another filter or tuned circuit $F_5$ selects a modulation product of these two frequencies $f_5$ and introduces it to a rectifier $AD_5$. The resultant direct current is impressed on the other winding 13 of the differential relay 11. This relay actuates the control apparatus CA which drives the variable attenuator VA in such a way as to maintain the currents in the two windings 12 and 13 of the differential relay 11 equal. The indicator I' shows the position of the variable attenuator VA and, therefore, as will be presently shown, the magnitude of the indication which was transmitted.

The operation of the system will now be analyzed for a particular case and there will be described the method of determining the frequency allocation so that the desired indication will be transmitted accurately despite variations in the transmission characteristics of the line which affect the frequencies differently. Let it be assumed that the currents generated by $G_1$, $G_2$ and $G_3$ may be written as sine functions such as $i_1=\sin\omega_1 t$, where $\omega=2\pi f$, $f$ being the frequency. Current $i_3$ is varied by the coupling device T in accordance with the indication of the meter or gauge I. Let the ratio of this device T be $a$; then the transmitted amplitudes of the three currents are:

$$i_1 = \sin \omega_1 t \tag{1}$$
$$i_2 = \sin \omega_2 t \tag{2}$$
$$i_3 = a \sin \omega_3 t \tag{3}$$

Now assume that the transmission loss caused by the line and equalizer is a constant $b$ at all three frequencies. Also let there be variations from initial condition in this line loss made up of two components, the first of which is constant at all three frequencies and may be included in the overall line loss $b$, and the second a loss $d$ which depends on the frequency. Now the received currents are expressed as:

$$i_1' = bd_1 \sin \omega_1 t \tag{4}$$
$$i_2' = bd_2 \sin \omega_2 t \tag{5}$$
$$i_3' = abd_3 \sin \omega_3 t \tag{6}$$

The variable attenuator VA is now assumed to attenuate the currents of frequencies $f_1$ and $f_2$ in the ratio $c$, and the current of frequency $f_3$ is passed unchanged to its modulator $AM_3$. The expressions for the currents at the input of the amplifier-modulators will be:

$$i_1'' = bd_1 c \sin \omega_1 t \tag{7}$$
$$i_2'' = bd_2 c \sin \omega_2 t \tag{8}$$
$$i_3'' = abd_3 \sin \omega_3 t \tag{9}$$

Both amplifiers may be assumed to have a gain $e$ which is the same at all three frequencies. Now let both modulators be of the second order type and assume that the filter $F_4$ is tuned to select the second harmonic of $f_3$, so that $f_4=2f_3$.

Also assume that the filter $F_5$ selects a frequency which is the sum or difference of the two frequencies introduced, so that $f_5 = f_1 \pm f_2$. The amplitudes of the modulation products will then be expressed by:

$$i_4 = \tfrac{1}{2} a^2 b^2 d_3^2 e^2 \cos 2\omega_3 t \quad (10)$$
$$i_5 = b^2 c^2 e^2 d_1 d_2 \cos (\omega_1 \pm \omega_2) t \quad (11)$$

When these currents are rectified the direct currents resulting, assuming a square law modulator, will have amplitudes:

$$I_4 = \tfrac{1}{8} a^4 b^4 d_3^4 e^4 \quad (12)$$
$$I_5 = \tfrac{1}{2} b^4 c^4 e^4 d_1^2 d_2^2 \quad (13)$$

If now we express the above ratios in decibels*

*See "Decibel—The Name for the Transmission Unit" by W. H. Martin, Bell System Technical Journal, January 1929.

relative to an arbitrary reference value and equate the two currents, since the differential relay and motor influence $c$ so that $I_4 = I_5$, we obtain.

$$20 \log \tfrac{1}{8} + 80 \log a + 80 \log b + 80 \log d_3 + 80 \log e =$$
$$20 \log \tfrac{1}{2} + 80 \log b + 80 \log c + 80 \log e + 40 \log d_1 + 40 \log d_2 \quad (14)$$

If now we let $A = 20 \log a$ and similarly throughout, we may write Equation (14)

$$18 + 4A + 4B + 4D_3 + 4E =$$
$$6 + 4B + 4C + 4E + 2D_1 + 2D_2 \quad (15)$$

This equation will be satisfied if the following relations obtain:

$$4C + 6 = 4A + 18, \text{ or } C = A + 3 \quad (16)$$

$$4D_3 = 2D_1 + 2D_2, \text{ or } D_3 = \frac{D_1 + D_2}{2} \quad (17)$$

It will be seen from the above Equation (16) that the indication on dial $I'$ which depends on $c$ will always correspond to the transmitted indication, which is represented by $a$, if the condition expressed in Equation (17) is satisfied. If the law of variation of $d$ with frequency is known, frequencies may be readily chosen to satisfy this condition, (17). If, for instance, this variation is directly proportional to frequency, that is $D = kf$, then since $D_3$ is the arithmetic mean of $D_1$ and $D_2$, $f_3$ will also be located midway between $f_1$ and $f_2$ in the frequency spectrum. It will also be noticed from Equation (15) that the equivalent of the line with equalizer or the variation in this equivalent which is uniform with frequency will not affect the accuracy of the transmitted indication.

In connection with remote indicating systems of the type already described, it may be desirable to obtain or record continuously the total of several indications received from remote points. An arrangement is shown in Fig. 3 by which this may be accomplished. The indication on meter $I_1$ is transmitted by means of some remote metering system comprising transmitter $T_1$, receiver $R_1$, and a communication channel $L_1$, and is reproduced on indicator $I_1'$. Other indications, such as $I_2$ and $I_3$, are similarly transmitted and reproduced on indicators $I_2'$ and $I_3'$. The telemetering system used may be one such as is described in this invention or any other suitable system. Also, if desired, any of the indications $I_1'$, $I_2'$ and $I_3'$ may be locally produced.

Attached to the indicators $I_1'$, $I_2'$ and $I_3'$ are variable resistances $VR_1$, $VR_2$ and $VR_3$, which are actuated respectively by the indicators. A battery $BA_1$ is shown, the current from which is used to energize the differential relay 31. Winding 32 of this relay is energized by the battery current after it has passed successively through the variable resistances $VR_3$, $VR_2$ and $VR_1$. Current for winding 33 of the relay passes first through variable resistance $VR_4$.

Operation of the differential relay 31 energizes either relay 34 or relay 35. The contacts of these relays are so connected to the motor 36 and the power source that the motor is operated in one direction or the other, depending on the operation of the differential relay. The motor, through some connecting mechanism such as the worm and gear 37, varies the amount of resistance $VR_4$ connected in the circuit. The operation of relays 31, 34 and 35 and motor 36 with driving mechanism 37 is such that the amount of resistance $VR_4$ in the circuit is always varied in such a direction as to restore the equality of the two currents in the differential relay 31. The dial $I_4$ is attached to the variable resistance and always indicates its position.

Since the currents in the two windings of the differential relay are maintained equal, the value of the resistance $VR_4$ connected in the circuit of winding 33 must be equal to the combined values of the resistances $VR_1$, $VR_2$ and $VR_3$ included in the circuit of winding 32. The dial $I_4$ may be calibrated similarly to dials $I_1'$, $I_2'$ and $I_3'$ and will indicate continuously the totals of the readings on these dials. The recording stylus 38 may be driven by the same device and used to make a graphical record of the readings of the indicator $I_4$ on a roll of paper driven by a clockwork 39.

Another arrangement which might be used to indicate the total of several other indications is shown in Fig. 4. Indicators $I_1'$, $I_2'$ and $I_3'$ which may be the indicators of remote quantities or local indicators, operate variable resistances $VR_1$, $VR_2$ and $VR_3$, respectively. These resistances are connected in series and form one arm of a Wheatstone bridge. The balancing arm consists of another variable resistance $VR_4$. The fixed ratio resistances $FR_1$ and $FR_2$ complete the bridge circuit. A source of direct current is connected to the bridge at terminals 1 and 3, and also energizes the field of an electric motor 41. The armature of the motor 41 is connected to terminals 2 and 4 of the bridge. The motor controls the variable resistance $VR_4$ through connection device 42. An indicator $I_4$ is operated in conjunction with this resistance $VR_4$.

In operation the field of the motor is always energized, but with the resistances so adjusted that the bridge is balanced, there is no voltage impressed on the armature winding, and the armature will not rotate. However, as soon as the balanced condition is disturbed by a change in the sum of $VR_1$, $VR_2$ and $VR_3$, a voltage difference will be created across terminals 2 and 4 of the bridge which will be applied to the armature of motor 41. This will cause the armature to rotate, and, through the driving mechanism 42, vary the amount of resistance $VR_4$ connected in the circuit. The polarity of the voltage across terminals 2 and 4 of the bridge will have a different polarity when $VR_4$ is larger than $$VR_1 + VR_2 + VR_3$$

than when $VR_4$ is smaller. The motor will thus always operate in such a direction as to balance the bridge and when balance has been reached the motor will come to a stop.

For the condition of balance the relation existing between the resistances is $$VR_4 = \frac{FR_2}{FR_1}(VR_1 + VR_2 + VR_3)$$

Since the balance is continuously maintained, the amount of $VR_4$ connected in the circuit is proportional to the sum of the amounts of $VR_1$, $VR_2$ and $VR_3$ included. Also since these are proportional to the quantities indicated by $I_1'$, $I_2'$ and $I_3'$, $I_4$ will indicate the total of the readings of $I_1'$, $I_2'$ and $I_3'$, and hence $I_1$, $I_2$ and $I_3$.

In some applications of remote indicating it may be advantageous, in order to economize on channel facilities, to transmit over the same channel a number of indications such as the readings of several meters located at the same remote point. This may be accomplished by means of the arrangement shown in Fig. 5. A plurality of indicators $I_1$, $I_2$, $I_3$ and $I_4$ is shown, each of which is attached to a potentiometer $P_1$, $P_2$, $P_3$ and $P_4$, respectively. As in the scheme shown in Fig. 1, two generators are provided, $G_1$ and $G_2$. By means of selectors $S_1$ and $S_2$, each potentiometer is connected successively into the circuit between $G_2$ and the filter or tuned circuit $F_2$, thus controlling the current amplitude of frequency $f_2$ in accordance with the indications $I_1$, $I_2$, $I_3$ and $I_4$, successively. Currents of both frequencies are transmitted through the contacts of relay 46 and over the line L to the receiving location. Current of frequency $f_2$ is here selected by the filter or tuned circuit $F_2'$, amplified and rectified by $AD_2$, and applied to one winding of the polar relay 11. Current of frequency $f_1$ is selected by the filter or tuned circuit $F_1$. By means of selectors $S_4$ and $S_5$, this current is transmitted successively through the potentiometers $P_1'$, $P_2'$, $P_3'$ and $P_4'$ to the amplifier and rectifier $AD_1$, the output of which is applied to the other winding of the polar relay 11.

The operation of the system for any single position of the selectors, such as the one shown in Fig. 5, is similar to that of the system shown in Fig. 1. A variation in the magnitude of the current flowing in one winding of the differential relay 11 will operate this relay and energize either relay 52 or relay 53. This applies power from some suitable source to the motor 58 in such a manner that it will operate in a direction depending on which relay was operated. Through the selector $S_6$ in the position shown in Fig. 5 the magnetic clutch $CL_1$ is energized, which couples the motor shaft to the potentiometer $P_1'$ and the indicating dial $I_1'$. The operation of the relays causes the motor to vary the position of $P_1'$ in such a direction as to restore the equality of the two currents in the differential relay 11. Thus, the system may be calibrated so that the indication on the dial $I_1'$ is the same as that on the distant meter $I_1$.

The operation of the selectors which enables the transmission of several indications over the same communication channel will now be explained, referring still to Fig. 5. A small electric motor 49 rotates the disc or cam 48 which has several raised portions or teeth arranged on its periphery. Passage of one such raised portion of the cam opens the contact 47. Relay 44 is normally energized and through its contacts in the operated position, relay 45 is also energized. The momentary interruption caused by one of the teeth on the disc 48, opening contact 47, deenergizes relay 44 whose armature drops back. This closes the circuit through the contacts of relay 45, the stepping magnets 41, 42 and 43, relay 46, and battery. Selectors $S_1$ and $S_2$ are thus advanced to the second position, connecting potentiometer $P_2$ in the circuit; selector $S_3$ is advanced and the line circuit is interrupted by relay 46. Relay 45 is of the slow-release type and its armature does not drop back during the momentary interruption being considered.

At the receiving location the interruption of the line circuit causes an interruption in the output of the rectifiers $AD_1$ and $AD_2$. Therefore, relay 50, which is in series with the output of $AD_2$ and normally energized is momentarily deenergized. Relay 51 is also normally energized through the contacts of relay 50, and being of the slow-release type its armature does not drop back with the momentary opening of the contacts of relay 50. In the relaxed position of relay 50 the armature closes a circuit through the contacts of relay 51, the stepping magnets 54, 55, 56 and 57, and battery. Thus selectors $S_4$ and $S_5$ are advanced to the second position and the potentiometer $P_2'$ is connected in the circuit. Selector $S_6$ is stepped to the second position which energizes the magnetic clutch $CL_2$ and couples the motor 58 to the potentiometer $P_2'$ and the indicating dial $I_2'$. Selector $S_7$ is also operated to its second contact.

After the interruption, relay 44 is again energized which allows the line circuit to close and energize relay 50, and the telemetering operation continues for the second indication.

This sequence of operations is repeated at intervals determined by the speed of rotation of the disc 48 until each of the indications has been transmitted. The last interruption is caused by the raised portion 48—a of the cam 48. This should cause the selectors to return to their initial position indicated in Fig. 4. If for any reason, such as failure of a relay to operate or an accidental interruption of the line circuit, the selectors at the transmitting and receiving locations are not in the proper relative positions, the long interruption of contact 47 caused by the segment 48—a will restore the selectors to the initial position automatically. The armature of relay 44 remains relayed during the whole interval. This holds the line circuit open which also allows relay 50 to relax. Now the armature of relay 45 falls back since the interval is longer than its operating delay. Now, if the selectors at the transmitting location are in any but the initial position, the stepping magnets will be energized through the contacts of selector $S_3$, the armature and released contact of relay 45, and the contacts connected with stepping magnet 43. As soon as the stepping margnets have operated the contacts of magnet 43 will be opened, thus deenergizing the stepping magnets. This allows the contacts of 43 to close again, thus reenergizing the stepping magnets if the selector is in any but its initial position. This process will be repeated until selector $S_3$ and consequently the selectors $S_1$ and $S_2$ are in the initial position shown, in which position the stepping magnets are not operated again because the circuit through selector $S_3$ is not completed. During these operations and for a short time afterwards relay 46 will keep the line circuit open due to its slow-release feature.

In the meantime at the receiving location relay 50 has been deenergized long enough to allow the armature of the slow-release relay 51 to drop back in exactly the same manner as at the transmitting end and selector $S_7$ will energize the stepping magnet if it is in any position but the initial position shown. The same sequence of events as that at the transmitting location will take place until all of the selectors have been restored to their initial positions.

When these events have had time to take place relay 46 will release and connect the transmitting apparatus to the line and the telemetering process will recommence in position 1. Meanwhile contact 47 will have closed again and the relays 44, 45, 50 and 51 will have taken up their operated positions as shown in Fig. 5, ready for the sequence of operations to be repeated as has already been explained.

Although this method of transmitting several indications over the same communication channel has been described in connection with the telemetering system shown in Fig. 1, it is equally applicable to that shown in Fig. 2 or some similar system.

Although the invention has been herein described in connection with particular embodiments, it will be understood that many modifications, both of circuit arrangement and instrumentalities employed, will be made without departing from the spirit or scope of the invention as set forth in the appended claims.

What is claimed is:

1. In a remote indicating system, the method of producing at a distant point an indication of the magnitude of a quantity existing at some other point which consists in producing between currents having different characteristics a current magnitude relation which depends upon the magnitude of said quantity, transmitting said currents to said distant point and utilizing the magnitude relation between the received currents to produce an indication of the magnitude of said quantity.

2. In a remote indicating system, the method of producing at a distant point an indication of the magnitude of a quantity existing at some other point which consists in producing between currents of different frequencies a current magnitude relation which depends upon the magnitude of said quantity, transmitting said currents of different frequencies to said distant point and utilizing the magnitude relation between the received currents to produce an indication of the magnitude of said quantity.

3. In a remote indicating system, the method of producing at a distant point an indication of the magnitude of a quantity existing at some other point which consists in producing between currents of different frequencies a current magnitude relation which depends upon the magnitude of said quantity, transmitting said currents of different frequencies to said distant point and utilizing the magnitude relation between the received currents to produce an indication of the magnitude of said quantity, the transmitted frequencies being so selected and utilized that said indication is substantially independent of variations in the characteristics of the transmitting medium.

4. In a remote indicating system, means for producing between currents having different characteristics a current magnitude relation which depends upon the magnitude of some quantity, means for transmitting said currents to a remote point, and means at this remote point for utilizing the magnitude relation between the received currents to produce an indication of the magnitude of said quantity.

5. In a remote indicating system, means for producing between currents of different frequencies a current magnitude relation which depends upon the magnitude of some quantity, means for transmitting said currents to a remote point, and means at this remote point for utilizing the magnitude relation between the received currents to produce an indication of the magnitude of said quantity.

6. In a remote indicating system, a plurality of sources of electrical energy of different frequencies, means for varying the amplitude of energy from at least one of said sources in accordance with the magnitude of some quantity, means for transmitting currents from said sources to a remote point, and means at the receiving location for determining and indicating the amplitude relation existing between said currents, thereby producing an indication of the magnitude of said quantity.

7. In a remote indicating system, two sources of electrical energy of different frequencies, means for varying the amplitude of energy from one of said sources in accordance with the magnitude of some quantity, a transmission medium for conveying currents of both frequencies from the transmitting location to a receiving location, and means at the receiving location for determining and indicating the relative amplitude of the two currents, thereby producing an indication of the magnitude of said quantity.

8. In a remote metering system, a measuring instrument having a movable element and a variable attenuator, means to vary the loss of said variable attenuator in accordance with the position of said movable element, an oscillation generator, the energy output of which is controlled by said variable attenuator, a second oscillation generator of different frequency whose energy output is constant, means for transmitting currents of the two frequencies to a remote point, and means at said point for indicating the magnitude ratio of the currents of the two frequencies, thereby reproducing the reading of said measuring instrument.

9. In a remote metering system, two energy sources of different frequencies, means for modulating current from one of said sources in accordance with the magnitude of some quantity, means for transmitting currents from both of said sources to a receiving location, frequency separating means, and means for determining and indicating the amplitude relation between the two currents, said determining and indicating means comprising, in combination, means for rectifying said currents, means for comparing the magnitudes of said rectified currents, and means for adjusting the magnitude of one of said currents prior to rectification, said adjusting means being controlled by said comparing means and being arranged to produce an indication of the original quantity.

10. In a remote indicating system, three sources of electrical energy, means for varying the amplitude of energy from one of said sources in accordance with the magnitude of some quantity, a transmission medium for transmitting the currents from said three generators, and apparatus at a receiving location for determining and indicating the amplitude relation between the three currents arranged so as to produce an indication of the magnitude of said quantity.

11. In a system for transmitting intelligence in the form of an amplitude relation between currents of different frequency, two sources of electrical energy of different frequencies, means for producing an amplitude relation between the currents from said sources which is proportional to some value, means for transmitting said currents through a transmission medium, and means for utilizing the amplitude relation between the received currents to reproduce the value, said frequencies being so chosen that the variations in the efficiency of the transmission medium at certain of said frequencies substantially compensate simultaneous variations at others of said frequencies, the said amplitude relation, and therefore the fidelity of reproduction of said value, being thereby rendered substantially independent of the variations in the characteristics of said medium.

12. In a system for transmitting intelligence in the form of a variation in the amplitude of a frequency, means to supply a plurality of currents of different frequencies, means to vary the amplitude of one of said frequencies, means to transmit, in addition to said frequency, unvaried amplitudes of a second and a third frequency through a transmission medium, the said three frequencies being so chosen that the instantaneous variations in the efficiency (expressed in decibels) of the transmission channel at said first frequency are equal to the means of the variations in the efficiency of said medium at said second and third frequencies, the variations at said second and third frequencies being utilized to substantially compensate the variations at said first frequency, so that a substantially correct reproduction of the transmitted variations in the amplitude of said first frequency is obtained.

13. In a remote indicating system, three sources of electrical energy of different frequencies, means for varying the amount of energy from one of said sources in accordance with the magnitude of some quantity, a transmission medium adapted to transmit the currents from said three generators, and apparatus, at a receiving location for determining and indicating the amplitude relation between the three currents, thereby producing an indication of the magnitude of said quantity, said frequencies being so related to each other and to the transmission characteristics of said transmission medium that said indication is substantially independent of variations in the transmission characteristics of the medium.

14. In a remote indicating system, means for producing between currents of different frequencies a magnitude relation which depends on the magnitude of some quantity, means for transmitting said currents through a transmission medium to some remote point, and means at this remote point for utilizing the magnitude relation between the received currents to produce an indication of the magnitude of said quantity, said frequencies being so related to each other and to the characteristics of the transmission medium that variations in the characteristics of the transmission medium at certain of said frequencies, are counteracted by variations at certain others of said frequencies whereby the fidelity of the indication is substantially independent of said variations.

ESTILL I. GREEN.
WARREN H. TIDD.